June 12, 1934.  A. KOTTMANN  1,962,690
APPARATUS FOR ACTUATING THE COUNTING WHEELS OF CALCULATING MACHINES
Filed May 27, 1932  2 Sheets-Sheet 1

INVENTOR
August Kottmann
BY
ATTORNEY.

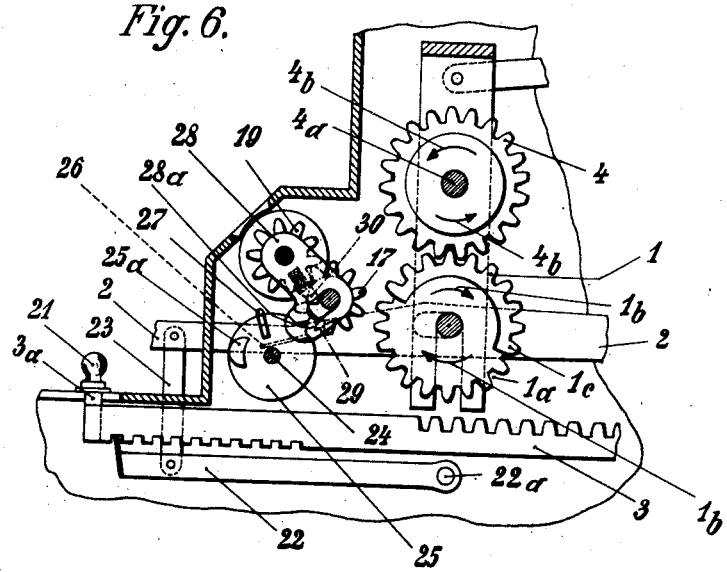

Patented June 12, 1934

1,962,690

UNITED STATES PATENT OFFICE 1,962,690

APPARATUS FOR ACTUATING THE COUNTING WHEELS OF CALCULATING MACHINES

August Kottmann, Sommerda, Germany, assignor to Rheinische Metallwaaren- und Maschinenfabrik Sommerda Aktiengesellschaft, Sommerda, Germany, a corporation of Germany Application May 27, 1932, Serial No. 613,969
In Germany June 5, 1931

6 Claims. (Cl. 235—79)

The invention relates to accumulator drives with rotary actuators as contrasted with accumulator drives having actuators which oscillate to and fro in a straight or circular path. The drive according to the invention is a modification of the drive according to German Patent No. 405,510.

The accumulator drive according to the invention has rotary actuators formed as toothed gear segments with fixed teeth and operated by a common driving member. All the segments are arranged loosely rotatable and alongside each other on a common shaft. The toothed gear segments are formed as lateral extensions of the tooth ring of complete tooth gears and the common driving member as a toothed drum.

The common shaft of the gear segments is journalled in a yoke which is pivotable about the axis of the toothed drum, whereby, while maintaining engagement between this drum and the gear segments, the latter can be brought into and out of mesh with gears which in turn operate the numeral wheels of the accumulator.

The yoke carrying the spindle of the gear segments is actuated by a cam device driven from the drum.

The actuation of the yoke carrying the spindle of the gear segments, for bringing the segments out of mesh with the numeral wheels, takes place in the same sense of rotation and at the same angular velocity as the rotation of the drum driving the segments.

The spindle carrying the gear segments is slidable both along the periphery of the drum and also in the direction of the radius of the drum, the latter for the purpose of disengaging the segments from the drum and, after setting up in the accumulator the number to be handled, of re-engaging the segments with the drum.

By sliding the spindle carrying the gear segments in the direction of the radius of the toothed drum, the gear segments unmeshed from the drum are brought into engagement with racks by actuating which the gear segments are rotated through an angle corresponding to the digit to be set up.

An example of a construction according to the invention is represented in the accompanying drawings in which Figure 1 is a vertical section through the actuating mechanism the driving shaft being in the "pull" position and all the toothed segments set to the digits 9.

Figure 6 is a vertical section similar to Figure 1 showing additional elements,

Figure 7 is a top view showing the rack setting means,

Figure 8 is a front view of the counting wheel and transfer mechanism, and

Figure 9 is a side view of the mechanism of Figure 8 in the position of rest.

Figure 1:
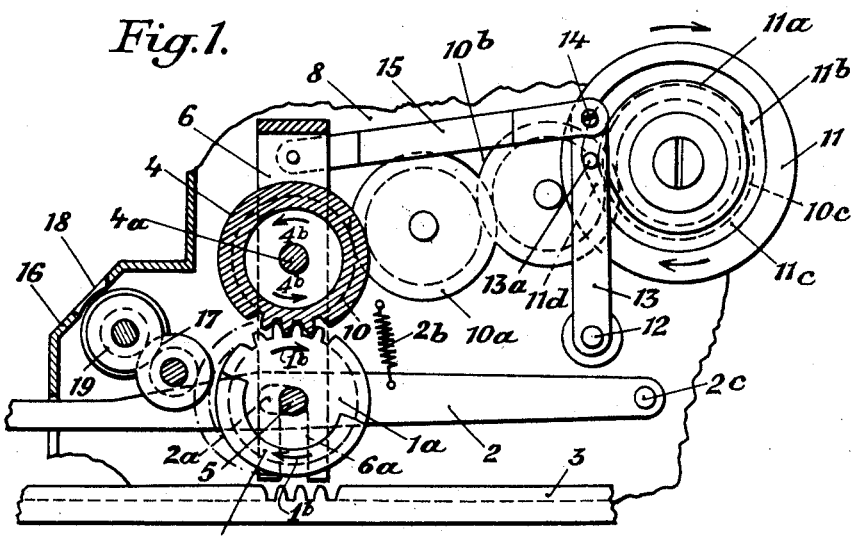
Figure 2:
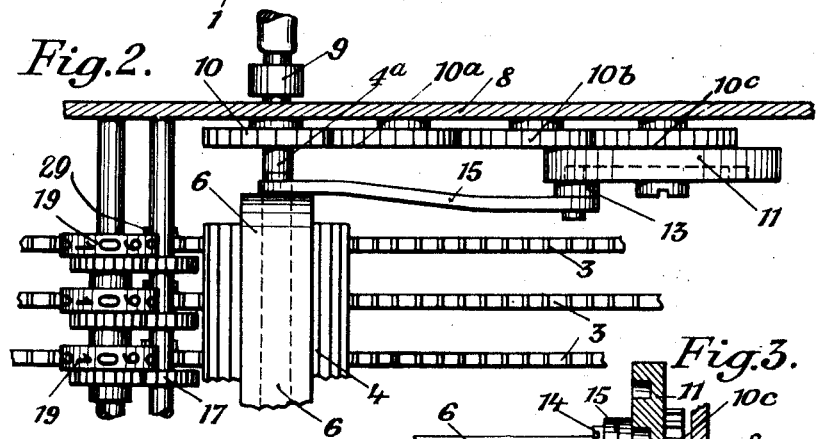
Figure 2 is a plan of a part of the counting wheel mechanism.
Figures 3, 4, 5:
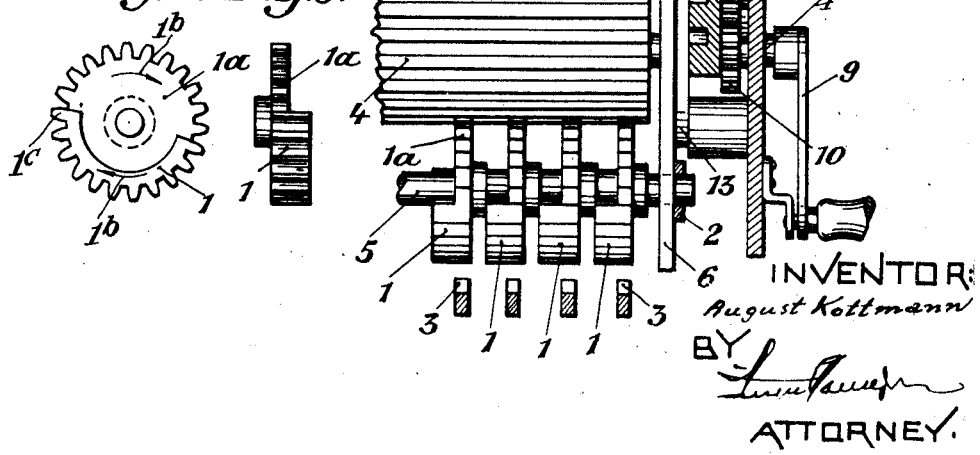
Figure 3 is a rear elevation corresponding to Figures 1 and 2.
Figures 4 and 5 represent two views of a wheel segment and gear wheel.

The toothed segments 1, loosely mounted on a spindle 5, are integral with gear wheels 1ª and are actuated by a roller 4, the shaft 4ª of which is journalled in the side wall 8 of the machine frame and is driven by a hand crank 9. The ends of the spindle 5 are mounted in circular curved slots 2ª formed in levers 2 arranged, respectively, on each side of the machine. The levers 2 are held by springs 2ᵇ in the position shown, in which the gear wheels 1ª of the segments 1 engage with the roller 4.

The levers 2 can be swung downwards about pins 2ᶜ, so that the wheels 1ª and the segments 1 are brought out of engagement with the roller 4 and engage with racks 3. On this downward movement, the ends of the spindle 5 slide in slots 6ª of a stirrup-shaped member 6, which is loosely mounted so as to oscillate on the axle 4ª of the roller 4. By the oscillation of the member 6 about the axle 4ª of the roller 4, the segments 1 are brought into the position shown in dot and dash lines in Figure 1, in which the segments engage with the gear wheels 17, which actuate gear wheels 19 of the digit rollers of the counting gear. The spindle 5 slides on the oscillating movement of the member 6, in the slots 2ª of the lever 2. The movement of the member 6 is effected by a link 15 and a lever 13 oscillated about a pin 12 by means of a pin 13ª on the lever 13 which engages in a curved groove 11ª, 11ᵇ, 11ᶜ, 11ᵈ of a cam disc 11. The cam disc 11 is actuated from the axle 4ª of the roller 4 by means of gear wheels 10, 10ª, 10ᵇ, 10ᶜ so that at each rotation of the roller 4 the cam disc 11 also completes one rotation.

The curved groove 11ª, 11ᵇ, 11ᶜ, 11ᵈ is constructed so that, at each rotation of the roller 4 and of the cam disc 11, the member 6 completes a to and fro oscillating movement. The groove consists of two circular portions 11ª and 11ᶜ of which the centre of curvature coincides with the axis of rotation of the cam disc, and the ends of which are connected by two intermediate curves 11$^b$ and 11$^d$.

As long as the pin 13$^a$ lies in the portions of the groove 11$^a$ and 11$^c$ the member 6 is at rest. When, however, the pin 13 is in the portions 11$^a$ or 11$^c$, the segments 1 are either in the positions shown in Figure 1 in full or in dot and dash lines. The roller 4, the segments 1 and the cam disc 11 rotate in the directions shown by the arrows. The intermediate curve 11$^d$, therefore, brings the member 6 out of the position shown in full lines in Figure 1, into the position shown in dot and dash lines and the intermediate curve 11$^b$ effects the converse movement. The angle subtended by the curves 11$^b$ or 11$^d$ is equal to the angle corresponding to the pitch of a tooth of the roller 4 and the segments 1. The oscillating movement of the member 6 is, therefore, effected in the interval of time in which the roller 4 is rotated through the pitch of a tooth. The curve 11$^b$ is formed, so that the member 6, during its oscillating movement which brings the segments 1 out of engagement with the gear wheels 17, is moved in the same direction and with the same angular velocity about the spindle 4$^a$ of the roller 4, as that at which the roller 4 rotates about this spindle. Then, considering only the movements of rotation, the roller 4 is at rest relatively to the movements of the segments 1 about the axle 4$^a$, the segments are, therefore, not rotated about the spindle 5 by the roller. The wheels 17 and 19 and the digit rollers of the counting wheels are, therefore, at rest during the interval of time in which the segments 1 are brought out of engagement with the gear wheels 17, so that any overrunning of the digit rollers is obviated. The values indicated by the counting mechanisms are visible in the windows 18 of the cover-plate 16.

The cam disc 11 is connected with the axle 4$^a$ of the roller 4, so that when the crank is at the dead position, the pin 13$^a$ of the lever 13 is in the position shown, that is directly in front of the curve 11$^d$. As soon as the crank leaves its initial position the member 6, the spindle 5 and the segments 1 are brought into the positions shown in the dot and dash lines in Figure 1, in which the segments 1 engage with the wheels 17. The angle subtended by the portion 11$^c$ is such that the curve 11$^b$ comes into operation after the roller 4 has been rotated through an angle corresponding to a rotation of the digit rollers through 9 units. All the segments 1 are, therefore, simultaneously brought out of engagement with the digit rollers after a rotation of the toothed roller 4 corresponding to 9 units.

In the segments 1, gears 1$^a$, toothed drum 4 and gears 17 and 19 the angle subtended by one tooth pitch is equal to the angle corresponding to one digit unit.

The segment 1 shown in Figure 6 is in its zero position. If the accumulator drive is operated with the segment in this position, by turning, by means of the handle 9, the toothed drum 4 in the direction of arrow 4$^b$ (Figure 1) and the segment 1 in the direction of arrow 1$^b$, then the accumulator place assigned to the segment 1 is not driven, as hereinafter explained in detail.

If, with this position of the segment 1, the drum 4 is rotated from its initial position, it is true that the shaft 5 with the segments 1 will be brought by the handle drive 11, 13, links 15 and yoke 6 into the dotted line position shown in Figure 1. Since, however, only the segments 1 lie in the same plane as the gear wheels 17 while the gear wheels 1$^a$ do not mesh therewith, movement is transmitted from the drum 4 through the segment 1 to the gear 17 only when the foremost tooth 1$^c$ of the segment engages the gear 17. In the position shown this does not occur until the drum 4 and the segment 1 have been turned through more than nine steps, that is through an angle greater than the angle of the nine units. Since, however, after turning the handle 9 and the drum 4 through an angle corresponding to nine units, the cam drive 11, 13, the yoke 6, the spindle 5, and the segment 1 again swing back into the position shown in full lines in Figure 1, the segment 1 does not come into engagement. On the contrary, at the instant when the tooth 1$^c$ is about to engage the gear 17, the segment is swung into an inoperative position.

By disengaging the segment 1 from the drum 4, turning it through one, two, three or more steps in the direction of the arrow 1$^b$, and then engaging it with the drum 4, then the segment is actuated corresponding to the values, 1, 2, 3, .... When the handle is turned, the segment 1 is not brought into its inoperative position by the handle drive 11, 13, line 15, and yoke 6, until 1, 2, 3, ... teeth of the segment 1 have engaged the gear 17 and have rotated this gear through the corresponding angle. At each operation of the handle 9, the drum 4 and the gear segment 1 will thus advance the corresponding numeral wheel by as many units as corresponds to the number of tooth pitches by which the segment 1 was rotated from zero position in the sense of the arrow 1$^b$.

The setting of the segments 1 is effected by the racks 3 (Figure 6). To position the segments 1, the levers 2, spindles 5, and segments 1 are swung downwardly whereby the complete gears 1$^a$ come out of mesh with the drum 4 and engage the racks 3. To prevent undesired rotation of the segments 1 owing to unbalance when they disengage, the arrangement is such that the gears 1$^a$ engage the racks 3 before they completely disengage the drum. The racks 3 are held in their set positions by the locking yokes 22 which are pivoted on pins 22$^a$ in the machine frame and are connected by the links 23 with the lever 2. The racks are set by means of buttons 21 and scales 21$^a$.

Transfer or tens-carrying takes place in the same way as in the known Odhner type of machine.

Transfer preparing bosses 29 (Figures 2, 6, 8, 9) on the gears 17 establish conditions, when a numeral wheel passes from 0 to 9 or vice versa, for a transfer to the numeral wheel of next higher order.

The tens transfer bosses engage projections 28$^a$ of the transfer preparing pawls 28 which are pivotally mounted on the shaft of the numeral wheels 19 and are guided on the shaft of the gears 17. By means of a spring slide 30 the pawls 28 are held in either operative or inoperative position. After preparing for a transfer the pawls 28 occupy the position shown in Figure 6 and in the right hand portion of Figure 8. In Figure 9 and the left hand portion of Figure 8 the pawls 28 are shown in position of rest. Each of the pawls 28 carries on the arm, on which the projection 28$^a$ on the side of the lower numeral wheel is arranged, and on the opposite side, a projection 28$^b$ (Figure 8) having a ramp.

On the shaft 24, which is driven by the shaft 4$^a$ of the drum 4, are arranged tens-carrying discs 25 carrying transfer levers 27 pivoted on pins 26 (Figure 6). If a transfer has been prepared at any place in the accumulator so that the corresponding pawl is in operative position according to Figure 6, then the corresponding transfer lever 27 encounters the ramp of the projection 28b and is forced into the plane of the transfer disc 25 and of the gear 17. As soon as the transfer lever passes the projection 28b it is again swung aside by a spring. The transfer lever contacting the ramp of the projection 28b advances the corresponding gear 17 and its numeral wheel 19 by one tooth, whereby the tens transfer is completed. The levers 27 are arranged staggered in known manner, whereby the tens transfer advances through the accumulator from the lowest to the highest order. The whole mechanism is known from calculating machines of the Odhner type and from other calculating machines whose accumulators comprise numeral wheels arranged loosely rotatable alongside each other on a common shaft.

The amount set in the segments 1 can be transmitted repeatedly to the counting gear as required for the purposes of multiplication and division.

When the transmission has been completed and the segments are to be brought back to zero, by again depressing the levers 2 the segments 1 can be again connected to the racks 3 in which the amount originally set is still retained. By returning the racks into their initial positions, the segments are also set to zero. After that a new value can be set.

If reversing gear is arranged before the digit rollers 19, the apparatus can be employed equally well for addition or subtraction.

I claim:

1. Mechanism for actuating the counting wheels of calculating machines, comprising shift members rotating always in the same direction and constructed as wheel segments having integral teeth; means common to all of said segments to set the members in rotation; and a spindle on which the members are loosely mounted side by side, each of said segments being formed as a lateral enlargement of the periphery of a complete gear wheel loosely mounted on the said spindle, and said means being in the form of a toothed roller for actuating said segments.

2. Counting wheel mechanism according to claim 1, in which means is provided whereby the spindle carrying the said segments is mounted parallel to the roller in a stirrup-shaped member to oscillate about the axle of the toothed roller and to be displaceable in the direction of rotation of the periphery of the roller, so that the roller and segments are maintained in engagement and the segments are brought in and out of engagement with the gear wheels actuating the digit rollers of the counting wheels.

3. Counting wheel mechanism according to claim 1, in which the spindle carrying the said segments is mounted parallel to the roller in a stirrup-shaped member adapted to oscillate about the axle of the toothed roller, and to be displaceable in the direction of rotation of the periphery of the roller, whereby the roller and segments are maintained in engagement and the segments are brought in and out of engagement with the gear wheels actuating the digit rollers of the counting wheels; and the movement of the spindle carrying the said segments being effected by a cam gear actuated by the said roller.

4. Counting wheel mechanism according to claim 1, in which the spindle carrying the said segments is mounted parallel to the roller in a stirrup-shaped member adapted to oscillate about the axle of the toothed roller, and to be displaceable in the direction of rotation of the periphery of the roller, whereby the roller and segments are maintained in engagement and the segments are brought in and out of engagement with the gear wheels actuating the digit rollers of the counting wheels; and the movement of the spindle carrying the said segments being effected by a cam gear actuated by the said roller, the cam gear being arranged so that the movement by which the wheel segments are brought out of engagement with the gear wheels actuating the digit rollers is effected in the same direction of rotation as, and approximately with the same angular velocity at which, the said roller rotates.

5. Counting wheel actuating mechanism according to claim 1, in which the said spindle is displaceable in the direction of the radius of the said roller to thereby couple the said segments with and uncouple them from the said roller the spindle of the segments being carried by a bail which is swingable about an axle of the machine frame, and the bail and spindle being held by springs in a position in which the gear wheels of the segments engage the roller which sets the segments in rotation, and for uncoupling the segments from the roller, the bail and spindle are swung against the force of the springs to a position in which the gear wheels of said segments are disengaged from said roller common to all segments.

6. Counting wheel actuating mechanism according to claim 1, including a plurality of racks which are arranged in such a manner that by uncoupling the segments from the roller which sets them in rotation they are at the same time brought into engagement with the racks, and by displacing the racks the segments are rotated through angles corresponding to the numerical values to be set.

AUGUST KOTTMANN.